Oct. 2, 1951     S. A. COULING     2,570,101
GEARING ARRANGEMENT FOR SUPERCHARGED POWER PLANT
Filed Jan. 14, 1947
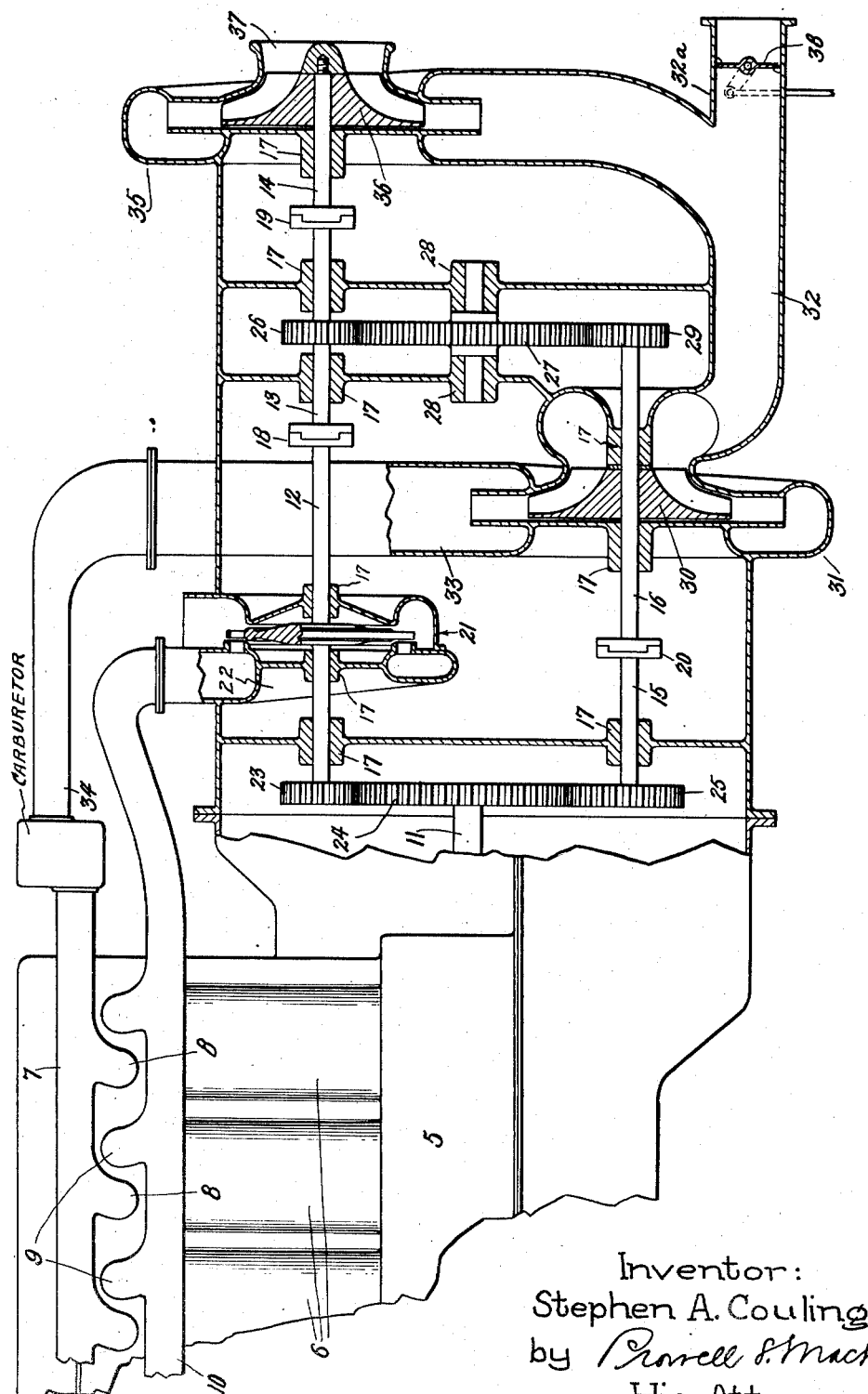
Inventor:
Stephen A. Couling,
by Prowell S. Mack
His Attorney.

UNITED STATES PATENT OFFICE 2,570,101

GEARING ARRANGEMENT FOR SUPER-CHARGED POWER PLANT

Stephen A. Couling, Rugby, England, assignor to General Electric Company, a corporation of New York Application January 14, 1947, Serial No. 722,048
In Great Britain February 13, 1942

Section 1, Public Law 690, August 8, 1946
Patent expires February 13, 1962

2 Claims. (Cl. 60—13)

This invention relates to a composite powerplant comprising a gas turbine associated with an internal combustion engine for utilizing the exhaust gases from the engine, as well as to drive a supercharger or to permit the engine to assist the turbine in driving the supercharger. Such a powerplant has come to be known to the aviation industry in the United States as a "compound engine," and is particularly attractive for application to aircraft propulsion.

An object of the invention is to provide an improved supercharged compound engine so arranged that when supercharging is not required, the energy recovered from the engine exhaust gases is returned to the engine crankshaft and is thus employed continuously, so that maximum overall thermal efficiency is obtained.

Another object of the invention is to provide a supercharging arrangement whereby one stage of the supercharger can be driven at different speeds.

A further object is to provide means for driving both stages of a two-stage supercharger simultaneously at different speeds.

Other objects and advantages will be apparent from the following description taken in connection with the accompanying drawing, in which the single figure is a view in elevation, partly sectioned, of a powerplant embodying this invention.

Referring now to the accompanying drawing, a reciprocating internal combustion engine is indicated diagrammatically at 5, having a plurality of cylinders 6. A combustible mixture is supplied to the cylinders by an intake manifold 7 through branch conduits 8, and the resulting products of combustion exhaust through stacks 9 to a manifold 10.

Arranged parallel with the engine crankshaft 11 are two countershafts, one having separate portions 12, 13, 14, and the other being divided into portions 15 and 16, all of which are supported by suitable bearings 17. Shaft portions 12, 13, 14 are arranged to be selectively connected together by suitable clutches 18, 19 while shaft portions 15, 16 are adapted to be connected in a similar manner by clutch 20. A gas turbine 21 is mounted on shaft 12 and has a nozzlebox 22 supplied with operating fluid from exhaust manifold 10. Secured to the end of shaft 12 is a pinion gear 23, which engages a gear 24 mounted on crankshaft 11, gear 24 in turn engaging a pinion 25 secured to shaft 15. Pinion 25 differs in the number of its teeth from pinion 23 so that the speed ratios of these pinions to gear 24 are different. Specifically, gear 25 may be larger than gear 23, so that shaft 15 will rotate slower than shaft 12 relative to the crankshaft speed. Secured to shaft 13 is a pinion 26 which engages an idler gear 27, supported by bearings 28. Gear 27, in turn, engages a pinion 29 secured to the end of shaft 16.

Mounted on shaft 16 is an impeller 30 of a centrifugal compressor 31, having an inlet conduit 32 and an outlet conduit 33. Conduit 33 communicates with the engine intake manifold 7 by means of a conduit 34.

With the power transmission described, supercharger 31 may be operated alone to provide single stage supercharging, or it may be used as the second stage of a two-stage supercharging system. To this end inlet conduit 32 of supercharger 31 communicates with the outlet of another compressor 35 having an impeller 36 carried by shaft 14 and an air intake annulus 37. In order that compressor 31 may receive air directly when operating alone, conduit 32 may be provided with an atmospheric vent 32a containing a valve 38, which may be controlled manually or automatically in any one of several ways.

The operation of my powerplant is as follows:
The turbine 21 is at all times geared directly to the engine crankshaft 11 through pinion 23 and gear wheel 24. To employ compressor 31 as a single stage supercharger, valve 38 is first actuated to open vent 32a to atmosphere. Clutch 20 is then engaged, and clutches 18 and 19 disengaged, to connect shafts 15, 16, whereupon the impeller 30 is driven, at a comparatively low speed, through gear 24 and pinion 25.

To obtain a higher speed ratio for the impeller 30, clutch 20 is disconnected and clutch 18 is engaged to connect shafts 12 and 13. As already indicated, gearing 23, 24, 25 may be arranged so that the ratio of gears 23, 24 is greater than that of gears 25, 24 so that shaft 12 rotates at a speed higher than that of shaft 15. Thus when impeller 30 is driven from shaft 12 through clutch 18, pinion 26, idler 27, and pinion 29, it rotates at a speed greater than that attained by the impeller when the drive is from shaft 15 through clutch 20 and a higher degree of supercharging is obtained. It will be apparent that the ratio of gears 26, 27, 29 must not be equal to that of gears 23, 24, 25 if the important advantage of different possible speeds of operation of impeller 13 is to be realized. Aside from this consideration, the ratio of gears 26, 27, 29 as compared with gears 23, 24, 25 is not critical and in practicing the invention these ratios may be varied to match the compressor characteristics.

When a still greater amount of supercharging is required, valve 38 is positioned to close vent 32a and clutch 18 is disengaged. Then clutches 19 and 20 are engaged to connect shafts 13, 14 and shafts 15, 16 respectively, so that both compressors 35 and 31 will be driven in series. With this arrangement the air discharged from supercharger 35 passes through conduit 32 to supercharger 31, thence through conduits 33, 34 to the intake manifold 7 of engine 5.

It will be seen that in this powerplant the gas turbine is always utilized to return energy to the engine crankshaft. By suitable design of the gearing overspeeding of the turbine wheel can be prevented, since the engine is operated at a controlled speed and the turbine wheel is geared thereto at a fixed speed ratio. A further advantage is that the energy for supercharging can be obtained either from the turbine-engine combination or from the reciprocating engine alone. Also provision is made for low and high speeds of the primary supercharger and for the two-stage compressor operation when still more supercharging is required.

While a particular embodiment of the invention has been illustrated and described, it will be obvious to those familiar with the art that various changes and modifications may be made without departing from the invention; and it is intended to cover in the appended claims all such changes and modifications as come within the true spirit and scope of the invention.

What I claim as new and desire to secure by Letters Patent of the United States is:

1. In an engine-turbine-compressor unit, the combination of a reciprocating internal combustion engine, a first countershaft divided into a first shaft portion carrying a gas turbine rotor, a second shaft portion, first clutch means for selectively coupling said first and second shaft portions, and a third shaft portion carrying a first compressor rotor, second clutch means adapted to selectively couple said second and third shaft portions, a second countershaft divided into a fourth shaft portion and a fifth shaft portion carrying a second compressor rotor, gearing connecting said first and fourth shaft portions at fixed speed ratios to the engine crankshaft, other gearing connecting said second and fifth shaft portions at a fixed speed ratio, third clutch means for selectively coupling said fourth and fifth shaft portions, hot gas conduit means connected to supply combustion products from the engine to the gas turbine, air conduit means connecting said first and second compressors in series and to the engine, and atmospheric vent means in said air conduit intermediate the first and second compressors, whereby said first compressor rotor can be driven to either of two gear trains for single stage supercharging and both compressors can be operated in series for two-stage supercharging.

2. In an engine-turbine-compressor unit, the combination of a reciprocating internal combustion engine, a first countershaft divided into a first shaft portion carrying a gas turbine rotor, a second shaft portion, clutch means for selectively coupling said second shaft portion to said first portion, and a third shaft portion carrying a first compressor rotor, second clutch means for selectively coupling said third shaft portion to the second shaft portion, a second countershaft divided into a fourth shaft portion and a fifth shaft portion carrying a second compressor rotor, third clutch means for selectively coupling said fifth shaft portion to the fourth shaft portion, gearing connecting said first and fourth shaft portions at fixed speed ratios to the engine crankshaft, other gearing connecting said second and fifth shaft portions at a fixed speed ratio, hot gas conduit means connected to supply combustion products from the engine to the gas turbine whereby the energy in the engine exhaust is utilized at all times, and air conduit means connecting said first and second compressors in series and to the engine, whereby said first compressor rotor can be driven through either of two gear trains for single stage supercharging and both compressors can be operated in series for two stage supercharging.

STEPHEN A. COULING.

REFERENCES CITED

The following references are of record in the file of this patent:

UNITED STATES PATENTS

| Number | Name | Date |
|---|---|---|
| 2,020,224 | Waseige | Nov. 5, 1935 |
| 2,065,955 | Waseige | Dec. 29, 1936 |
| 2,173,595 | Schütte | Sept. 19, 1939 |

FOREIGN PATENTS

| Number | Country | Date |
|---|---|---|
| 398,902 | Germany | July 16, 1924 |